March 29, 1932.  W. D. HUFF  1,851,840
SICKLE BAR
Filed Aug. 29, 1930    2 Sheets-Sheet 1
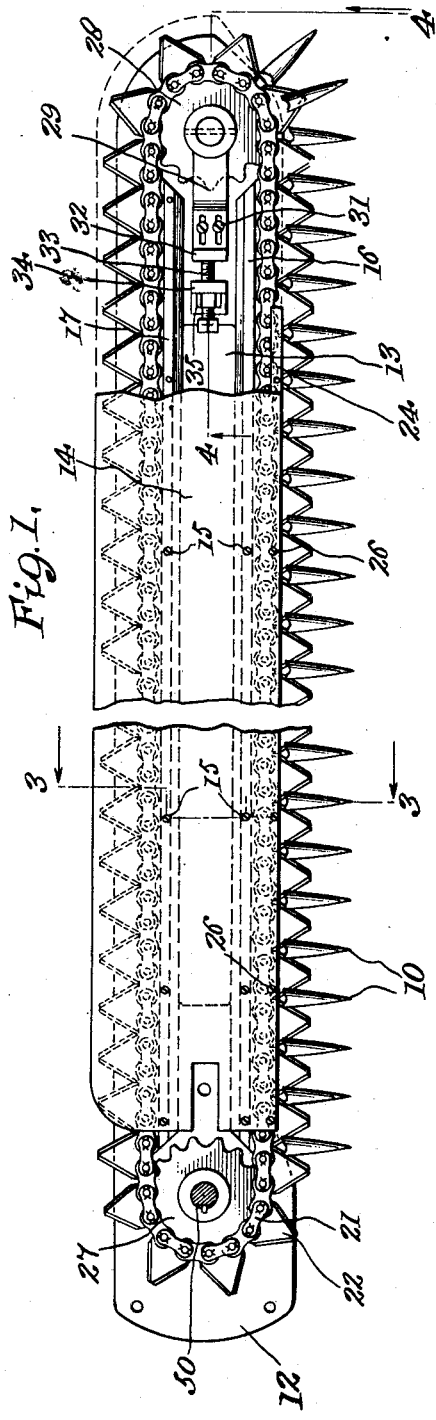
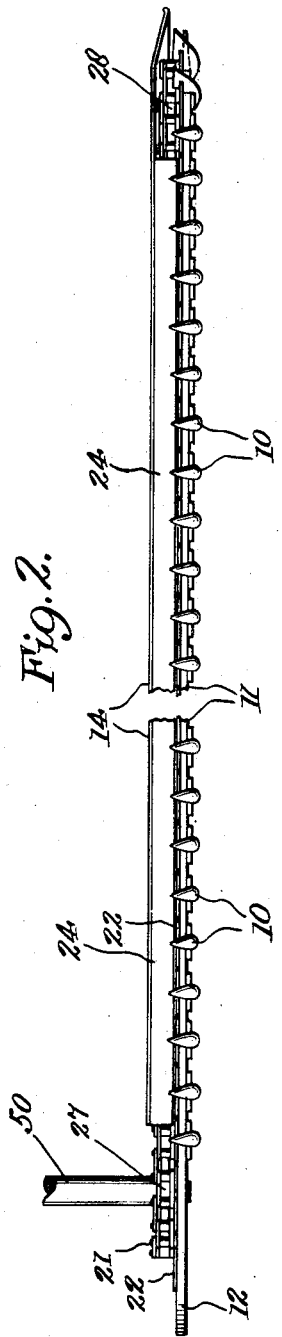
Inventor
William D. Huff
By Wilkinson & Mawhinney
Attorneys.

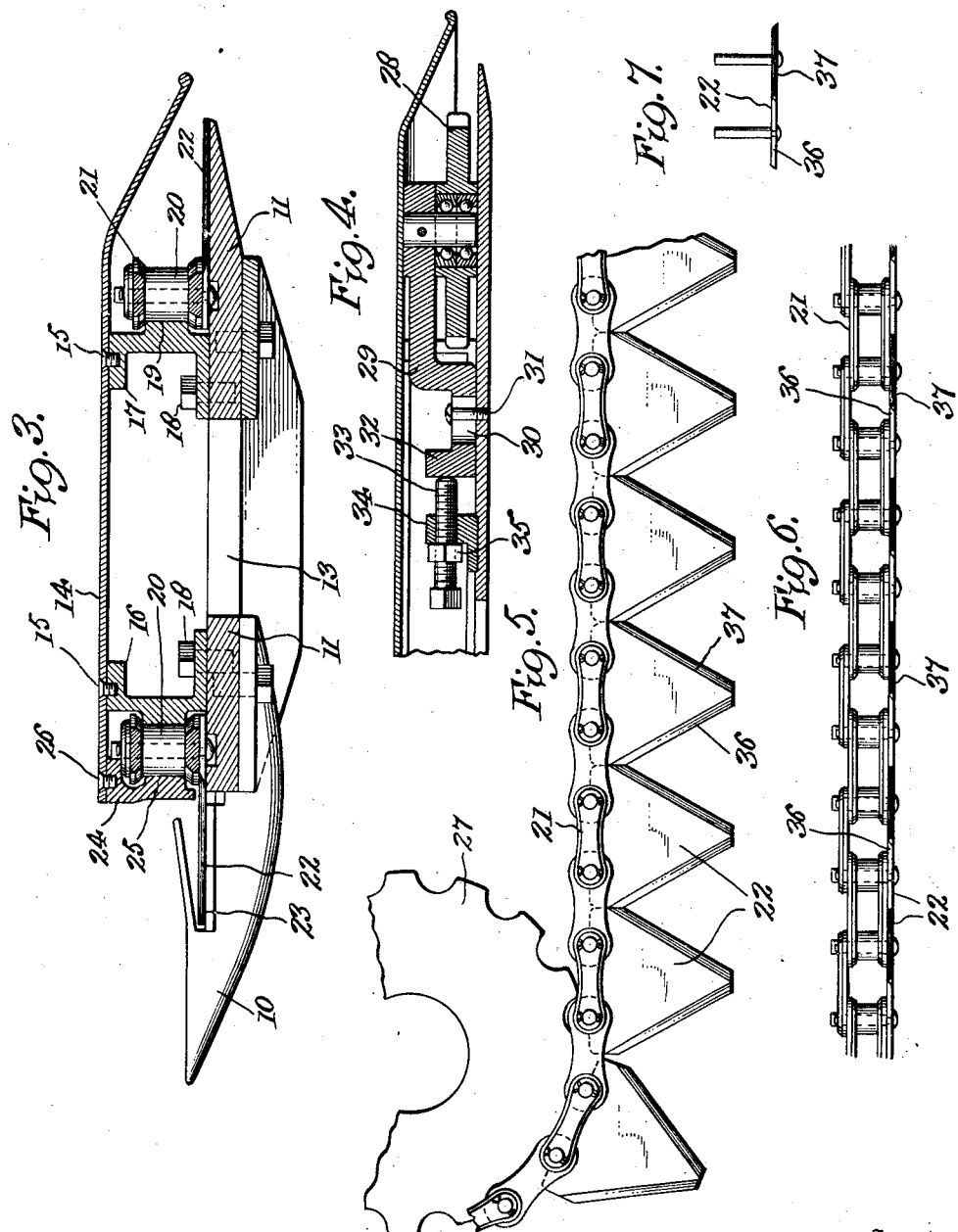

Patented Mar. 29, 1932

1,851,840

UNITED STATES PATENT OFFICE

WILLIAM DANIEL HUFF, OF LAFAYETTE, LOUISIANA, ASSIGNOR TO FAIRMOUNT RAILWAY MOTORS, INCORPORATED, OF FAIRMOUNT, MINNESOTA, A CORPORATION OF MINNESOTA

SICKLE BAR

Application filed August 29, 1930. Serial No. 478,757.

The present invention relates to improvements in sickle bars, and has for an object to provide an improved sickle bar useful generally, but more particularly in connection with the apparatus shown and described in my co-pending application, entitled Improvements in controlling device for manipulating and adjusting sickle cutting bars, Serial No. 478,756 filed of even date herewith.

An object of the invention is to provide an improved sickle bar, in which a plurality of movable blades are arranged to move past stationary blades, yielding a rapid and effective cutting action, such as will be useful in connection with the cutting of grass and undergrowth bordering railroads, highways and the like, where the sickle is carried by a vehicle movable along the railroad or highway.

Another object of the invention is to provide an improved sickle using the present standard sickle blades, such as employed on standard mowing machines, also the present standard guards and a standard roller chain, which makes a practical device, which will be strong and rigid and capable of withstanding the rugged use to which it will be subjected.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view, with parts broken away, of an improved sickle bar constructed in accordance with the present invention.

Figure 2 is a front elevation of the same.

Figure 3 is an enlarged section taken along the line 3—3 in Figure 1.

Figure 4 is a section taken along the line 4—4 also in Figure 1.

Figure 5 is a fragmentary plan view of a movable cutter.

Figure 6 is a fragmentary edge view of the same, and

Figure 7 is a front view of the blade and pins.

Referring more particularly to the drawings, 10 designates the stationary teeth or guards of the device, which are carried upon a bottom plate 11, which bottom plate is provided with an extension piece 12 at one end thereof for the purpose of receiving the attaching bracket, which is more particularly shown in my co-pending application aforesaid.

The intermediate portion of the bottom plate 11 is cut away or removed, as indicated at 13, to secure lightness.

The top plate is indicated at 14, and it is secured, as by the screws or other fastenings 15, to channel guide members 16 and 17, which channel members are secured at their lower portions by the bolts or other fastenings 18 (Figure 3) to the bottom plate 11 at opposite sides of the slot 13.

The channels of the members 16 and 17 preferably face one another and the cut away portion 13; the outer portions of such channels being provided with guide rails 19 (Figure 3) adapted to receive the rollers 20 on the endless chain 21, to which the movable cutter teeth 22 are secured. These teeth 22 are arranged to run through slots 23 in the stationary teeth 10 and to cooperate with such stationary teeth for the purpose of cutting the material entering between such teeth.

A further guide member 24 is disposed at the front of the device, having a guide rail 25 projecting inwardly for receiving the outer portions of the rollers 20 of the chain. Thus two guide members 16 and 24 reinforce and support the chain at opposite sides at the front portion of the sickle where the travelling cutter teeth 22 are engaged in the operation of cutting. It will be noted that the front member 24 is supported solely by the top plate 14, as by the use of fastening 26, and there is no connection between the lower edge of this member 24 and the lower plate, there being a gap left at this point, through which the teeth 22 project.

As shown more particularly in Figures 1 and 2, the chain is adapted to run over sprockets 27 and 28. The sprocket 27 is the drive sprocket and is connected to a shaft 50 receiving rotation from an electric or other motor.

With the idler sprocket 28 is preferably associated a tightening device, shown to best advantage in Figures 1 and 4, and including a slidable bracket 29 having slots 30 therein guided by screws or pins 31, which are threaded or otherwise engaged with the bottom plate 11.

A lug 32 on the end of the bracket 29 is engaged by an adjusting screw 33 threaded through a perforated lug 34 also carried by the bottom plate 11. A lock nut 35 is adapted to be run up against the lug 34 for the purpose of binding the adjusting screw 33 against casual rotation.

Referring more particularly to Figures 5 and 6, the teeth 22 are the standard sickle section or blade and the use of both cutting edges is had by reversing the drive motor so as to run chain in opposite direction. The teeth 22 are provided with the opposed inclined cutting edges 36 and 37.

In the use of the device, the shaft 50 is driven by appropriate power, which causes the sprocket 27 and the chain 21 to be rotated. The blades 22 are thus moved through the stationary blades or teeth 10 and act to cut and sever the grass, undergrowth, or other material with which such device is brought into contact. The idler sprocket 28 may be adjusted from time to time by backing off the lock nut 35 and turning up the adjusting screw 33, whereupon the lock nut 35 is again turned up tightly against the lug 34.

The chain will run freely about the track, which forms part of the enclosing casing for the device. This casing will enclose all of the parts and protect the operator against exposure to the blades, the blades being substantially exposed only at the front part of the device and between the stationary teeth 10, which will add further protection.

The movable teeth 22 are supported in an erect position during the cutting operation, and will be prevented from being deflected up or down by the material reacted upon.

When desired, the chain may be reversed in direction so as to use the other edges of the blades 22.

It will be appreciated that a strong, rigid and durable construction is produced using in its moving and wearing parts those which are now standard material for this purpose. The device is designed for inexpensive construction and for quick and economical assembly.

It will be obvious that various changes in the construction, combination and arrangement of the parts might be made, which could be used without departing from the spirit of my invention, and I do not mean to limit the invention to such details, except as particularly pointed out in the claims.

Having thus described my invention, what I claim and desire to secure by Letters Patent of the United States is:—

1. In an improved sickle bar, a frame comprising upper and lower plates, front and rear guide members connected between the plates, an endless chain having rollers thereon for engaging the outer faces of the guide members, a third guide member carried by the upper plate spaced exteriorly to the front guide member and extending in opposed relation to said front guide member to form a restricted passageway for the rollers of the chain and reinforce the chain at the front of the device, the third guide member having its lower edge spaced from the lower plate, movable blades carried by the chain projecting outwardly below the third guide member and beyond the same, and stationary teeth projecting from the frame for cooperating with said blades.

2. In an improved sickle bar, a frame comprising upper and lower plates, front and rear guide members connected between the plates, said guide members having outwardly projecting rail portions, an endless chain provided with rotatable rollers for engaging the rail portions, a third guide member provided with a rail portion carried by the upper plate extending in opposed relation to the front guide member and having its lower edge spaced from the lower plate, the said rail portions on the front guide member and the third guide member being aligned to form walls to engage the rollers on the chain and reinforce the same along the front of the device, movable blades carried by the chain projecting outwardly below the third guide member and beyond the same, and stationary teeth carried by the frame to engage the said blades.

WILLIAM DANIEL HUFF.